C. S. CORRIGAN.
MINING MACHINE.
APPLICATION FILED JULY 30, 1919.
1,351,892.
Patented Sept. 7, 1920.
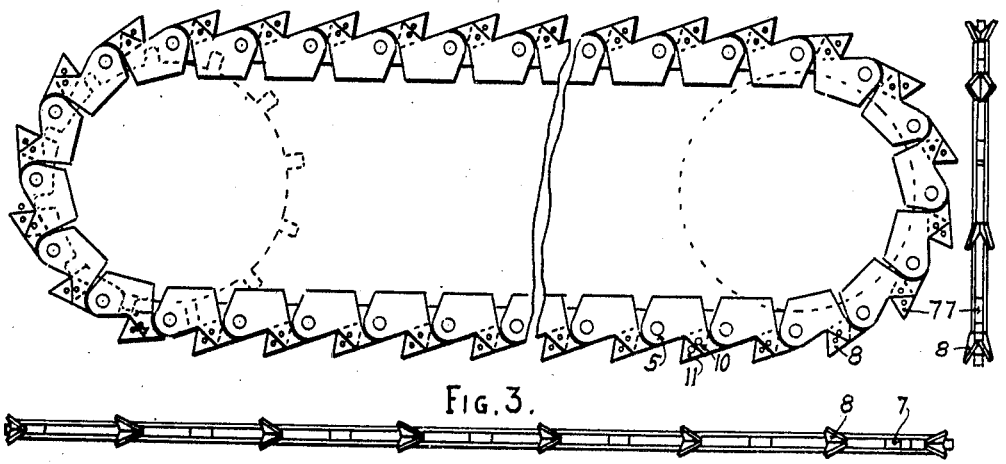
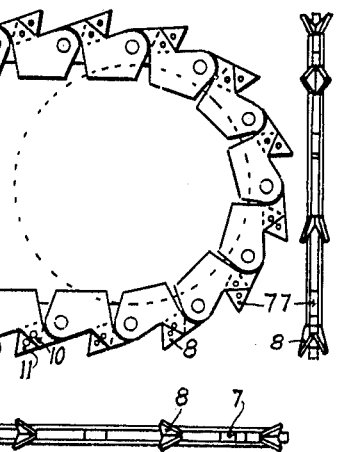
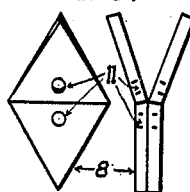
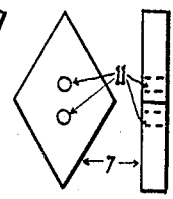
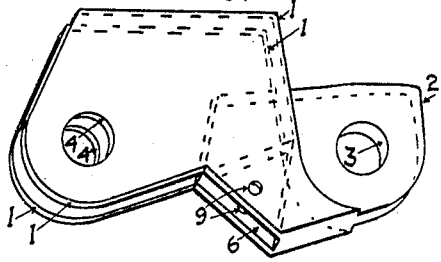
Inventor
Clyde S Corrigan
By Allen & Allen
Attorneys

UNITED STATES PATENT OFFICE.

CLYDE S. CORRIGAN, OF NORWOOD, OHIO.

MINING-MACHINE.

1,351,892.  Specification of Letters Patent.  Patented Sept. 7, 1920.

Application filed July 30, 1919. Serial No. 314,249.

*To all whom it may concern:*

Be it known that I, CLYDE S. CORRIGAN, a citizen of the United States, and a resident of Norwood, in the county of Hamilton and State of Ohio, have invented certain new and useful Improvements in Mining-Machines, of which the following is a full, clear, and exact description, reference being had to the accompanying drawing, forming part of this specification.

My invention relates to sawing machines for cutting slits or kerfs in coal, rock, and other solid materials so that cubical blocks may be removed without the use of explosives in tunneling or mining such materials, and making it easier and cheaper to handle and transport them.

I am aware that there have been saws prepared for coal mining and the like, but so far as I am informed, these saws have not met with success due to various foreign substances in the coal, such as iron and sulfur, breaking or dulling the teeth, and this defect I overcome by providing renewable teeth of carborundum or suitable material for cutting such substances.

The object of my invention is to provide a chain saw which has demountable teeth of hard material, such as steel, carborundum or the like, that can be easily inserted or removed from the chain and inexpensively renewed when dull or broken.

It is also my object in a chain saw to provide special link members for the chain, pivotally connected and adapted to move in an orbit about an adjustable frame or track, making it possible to keep the chain at proper tension for working and also allow the entire chain to be readily removed from the frame for repairs and renewing teeth without disconnecting any links. I further provide reversible teeth of the self-sharpening type, which can be inverted and used a number of times, always presenting a sharp cutting edge to the material to be cut; and interspaced in connection with plain cutter teeth I provide bent cutter teeth of the same general shape and size, but bent outwardly so as to make wider the cut of the interspaced plain cutter teeth, thereby allowing the mechanism of the saw to be readily introduced into the cut and then caused to proceed in any direction, thereby making it possible to cut out and detach cubical blocks of coal or other material and entirely do away with the use of explosives in tunneling and mining.

These objects and other advantages which will be noted I accomplish by that certain construction and arrangement of parts hereinafter more specifically pointed out and claimed.

In the drawing, Figure 1 is a side elevation of the chain saw.

Fig. 2 is a vertical end view of the chain saw.

Fig. 3 is a horizontal view of the saw.

Fig. 4 is an isometric perspective view of one of the chain links.

Fig. 5 shows the plain teeth, and Fig. 6 the bent teeth.

The frame of the device is omitted not being concerned with the saw itself.

The links of the chain are formed integrally or not as desired, and consist of the bifurcated portions 1, 1, and the single portion 2 to either of which may be added extra members. It will be noted that the holes 3 and 4, in opposite ends of the links receive connecting pins or rivets 5, and that the single end 2 of one link fits between the bifurcated ends 1, 1, of the adjoining link, thereby forming the chain, and the spacing of the bifurcated ends 1, 1, is such as to permit the links to fit down over and slide freely along the frame and driving mechanism by which it is propelled.

In each link is formed a strong retaining device or socket 6, shaped to receive the teeth, and holes 9, 9, are pierced through the socket walls for screws or rivets 10 to rigidly hold the teeth in place and at the proper angle for cutting. The teeth themselves may be of any shape of hard material. I have shown flat diamond shaped teeth, both for plain cutting teeth 7 (Fig. 5) and bent cutting teeth 8 (Fig. 6).

The plain and bent teeth are preferably interspaced through the links of the chain, but may both be used in each link. Each tooth has two rivet holes 11, 11, located the same distance from the center line as the rivet or screw holes 9, 9, are inside the mouth of the socket. The result of this is that the teeth are riveted or fastened and held firmly in the socket and at the proper angle while working. When the teeth are dull on one edge, the fastening may be removed, the teeth turned over and fastened through the same hole or reversed and fastened through the other hole, presenting a new and sharp cutting edge.

The bent teeth 8 are shown one half the thickness of the plain teeth and bent at the middle along the short diagonal, the object being to set two teeth in one socket with the outer ends diverging and held rigidly in place by one rivet so that they widen the kerf cut by the plain teeth and allow the saw mechanism to advance and move in any direction within the face of the coal or other material being cut.

Proper framework and operating parts will permit the operator to move the saw forward into the face of a vein of coal, or other material in any direction, cutting as many vertical and horizontal slots as necessary, and after a small opening has been formed, a saw may be inserted to cut the blocks loose on the back, it may also be used to cut out what is called the parting in coal veins.

While I have shown and described the preferred construction and arrangement of the various parts, it is understood that the device is susceptible of many modifications without departing from the essential features or sacrificing any of the advantages of the invention.

Having thus described my invention, what I claim as new and desire to secure by Letters Patent, is:

1. A chain saw comprising pivotally connected links having sockets therein, cutting teeth reversibly positioned in the sockets each of said teeth being symmetrical about a plane passing through the center of said tooth and having cutting portions which are of the same shape as said sockets, any one of said cutting portions being adapted to be secured within the socket in a plurality of positions presenting another of the cutting portions of said tooth in a position for cutting the material to be operated upon and means passing transversely through the sides of the sockets and through the portions of the teeth which are within the sockets for holding the teeth in place.

2. A chain saw comprising pivotally connected links with sockets therein, teeth having a plurality of cutting edges which fit said sockets, parts of certain of said teeth being bent so that their cutting edges will project beyond the sides of the links, each of the teeth having a plurality of holes, the holes adjacent to each cutting edge being positioned to correspond with holes in the sides of the sockets and removable means passing through said holes for demountably holding the teeth in place.

3. A chain saw composed of links with sockets in all or in part of the links, said sockets being shaped to fit cutting edges of teeth having a plurality of cutting edges, each socket having holes transversely through the sides positioned to correspond with openings in the teeth so that means for demountably fastening the teeth may be passed transversely through the links.

4. A saw provided with sockets along the periphery thereof, said sockets opening in a plane making an acute angle with the direction of the movement of said periphery, reversible teeth having a plurality of cutting edges in said sockets and means passing through the sides of the saw so positioned as to pass through one of a plurality of openings in the teeth to hold the same in position.

5. A saw provided with sockets therein, teeth having a plurality of similarly formed cutting portions, parts of certain of said teeth being bent so that their cutting edges will cut wider than the thickness of the saw, any one of said cutting portions being shaped to fit within a socket of the saw while another cutting portion of said tooth is in position for cutting the material operated upon, and means passing transversely through the sides of the saw and through the teeth for holding the teeth in place.

6. A chain saw for cutting minerals, comprising links pivotally secured together and having triangular shaped sockets therein, and diamond shaped teeth removably mounted in said sockets.

7. A chain saw for cutting minerals, comprising links pivotally secured together and having triangular shaped sockets therein, and diamond shaped teeth removably mounted in said sockets, said teeth provided with holes at each side of the short diagonal, and holes in the sockets, for the purpose described.

8. A chain saw comprising pivotally connected links capable of being moved close to the periphery of a suitable track or frame, sockets in the links, each of said sockets opening in a direction at an acute angle to the line of travel of the chain, flat teeth adapted to be secured in said sockets in a plurality of positions, each tooth having similarly formed cutting portions arranged about the center thereof, parts of certain of said teeth being positioned so that the cutting edges will project beyond the sides of the saw, removable means for demountably fastening one of the cutting edges within said sockets, thereby holding another cutting edge of said tooth in position for cutting the material operated upon.

CLYDE S. CORRIGAN.